United States Patent [19]
Khalil

[11] Patent Number: 5,639,313
[45] Date of Patent: Jun. 17, 1997

[54] PROCESS FOR THE THERMO-CHEMICAL DEWAXING OF HYDROCARBON TRANSMISSION CONDUITS

[75] Inventor: Carlos Nagib Khalil, Rio de Janeiro, RJ, Brazil

[73] Assignee: Petroleo Brasileiro S.A. - Petrobras, Rio de Janiero, Brazil

[21] Appl. No.: 167,478

[22] Filed: Dec. 15, 1993

[30] Foreign Application Priority Data

Mar. 15, 1993 [BR] Brazil ..................... 9301171

[51] Int. Cl.$^6$ ............... B08B 7/04; B08B 9/02
[52] U.S. Cl. .............. 134/18; 134/22.12; 134/22.13; 134/22.14; 134/40; 166/309
[58] Field of Search ................. 134/18, 22.12, 134/22.13, 22.14, 40; 252/8.552

[56] References Cited

U.S. PATENT DOCUMENTS

| | | | |
|---|---|---|---|
| 2,741,596 | 4/1956 | Wark et al. | 134/22.14 X |
| 3,689,319 | 9/1972 | Sample et al. | 134/22.14 X |
| 3,970,097 | 7/1976 | Voellmy et al. | 137/1 |
| 4,003,393 | 1/1977 | Jaggard et al. | 134/22.14 X |
| 4,210,809 | 7/1980 | Pelavin | 250/343 |
| 4,216,026 | 8/1980 | Scott | 134/4 |
| 4,473,408 | 9/1984 | Purinton, Jr. | 134/8 |
| 4,537,700 | 8/1985 | Punnton, Jr. | 134/8 X |
| 4,543,131 | 9/1985 | Punnton, Jr. | 134/8 |
| 4,755,230 | 7/1988 | Ashton et al. | 134/22.14 |
| 4,846,277 | 7/1989 | Khalil et al. | 166/280 |
| 5,011,538 | 4/1991 | Smith | 134/22.13 |
| 5,215,781 | 6/1993 | Lowther | 134/22.14 X |

OTHER PUBLICATIONS

"Thermochemical Process to Remove Paraffin Deposits in Subsea Production Lines", C. Khalil et al. OTC Conference, 1994, 7 pgs.

*Primary Examiner*—David A. Simmons
*Assistant Examiner*—Sean Vincent
*Attorney, Agent, or Firm*—Sughrue, Mion, Zinn, Macpeak & Seas

[57] ABSTRACT

A process for the thermo-chemical dewaxing of hydrocarbon transmission is described, which comprises, after assessment of the conduit internal effective volume, treating the wax-containing conduit with a water-in-oil emulsion, co-currently to the production flow. The emulsion contains inorganic reactants which generate nitrogen and heat, which fluidize the paraffin deposit which is later driven off by cleaning beds. The percentual of removed paraffin is known by assessing the final internal effective volume.

6 Claims, 5 Drawing Sheets

1 – PUMP
2 – CONTRASTING FLUID
3 – DISPLACING FLUID
4 – TRANSPARENT TUBING
5 – MEASUREMENT DEVICE

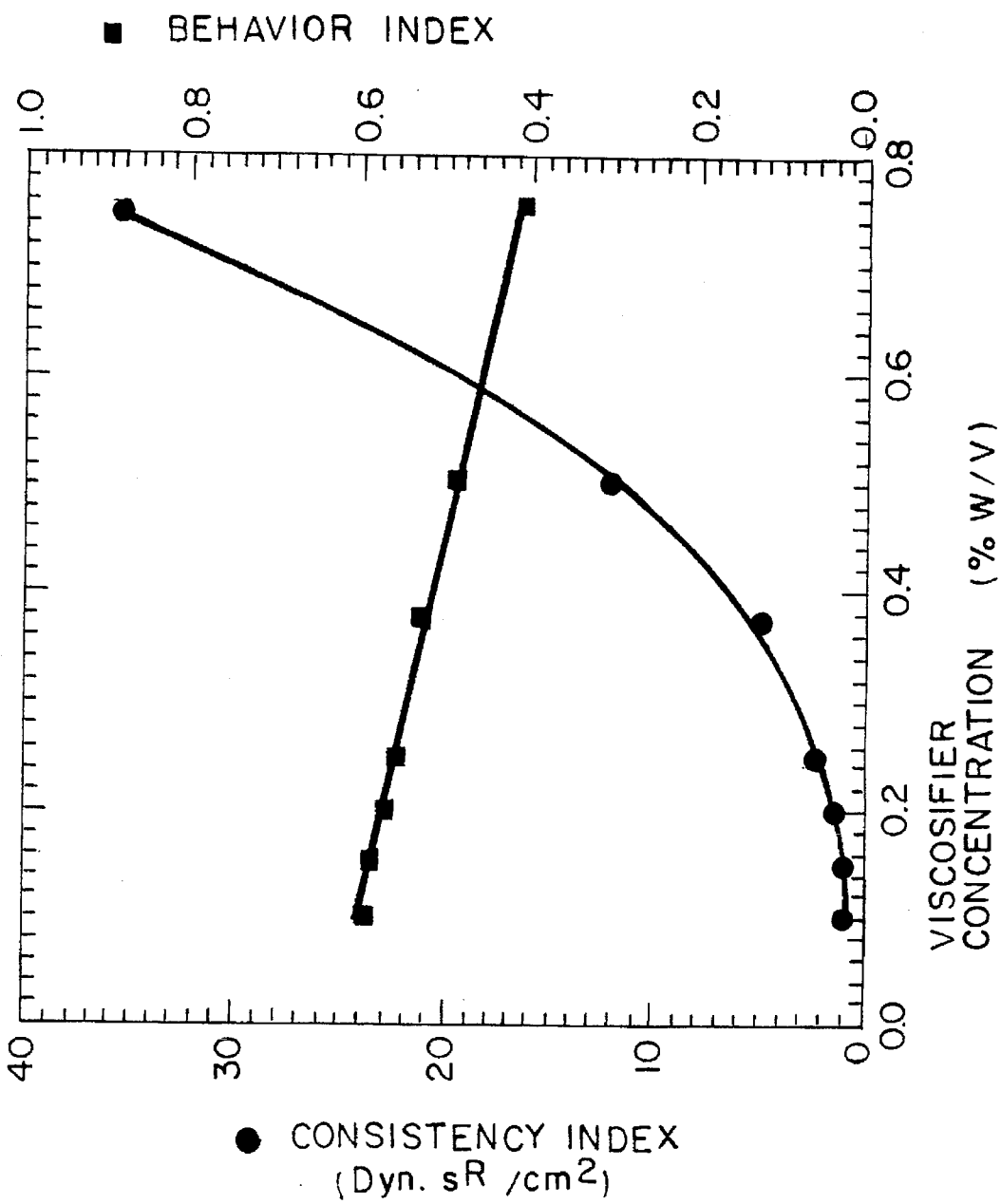

PROCESS FOR THE THERMO-CHEMICAL DEWAXING OF HYDROCARBON TRANSMISSION CONDUITS

BACKGROUND OF THE INVENTION

1. Field of the Invention

This invention relates to a process for thermo-chemically dewaxing hydrocarbon transmission conduits. More specifically, the present invention relates to a process for thermo-chemically dewaxing hydrocarbon transmission conduits which are either on the surface or subsea, the method being effected by injecting one or more emulsified beds of Nitrogen Generating System NGS plus heat while the emulsion breaking time is previously calculated so as to dissolve the maximum possible amount of the paraffin deposits within the conduit with simultaneous and safe removal of the fluidized paraffin deposit, such removal being effected co-currently to the production flow, so as to avoid the building up of non-fluidized plugs or deposits in the interior of the conduit.

2. Prior Art

The expression "hydrocarbon transmission conduits" is applied to any cylindrical means for transmitting hydrocarbons, either in the liquid or gaseous state, since the reservoirs wherefrom they are extracted and up to the christmas tree of the subsea well, or either up to the land wellhead, as well as since the subsea well christmas tree and up to the surface sea installations ("production platforms"), or else to any conduits connecting sea installations to terminals and for primary working station, and lastly to same connecting these stations to refineries and/or petroleum or petroleum-derived products processing plants, which can, due to several reasons, develop paraffinic deposits in their interior. On the other hand, in subsea conduits, according to the specific oil being produced, oil temperatures below the Initial Crystal Temperature ICT, as well as the hydrodynamical characteristics of production flow can cause the deposition of paraffins, asphaltenes and resins.

U.S. Pat. No. 4,755,230 to J. P. Ashton at al, of Jul. 5, 1988, relates to a process for dewaxing subsea conduits which comprises injecting an oil-in-water emulsion of an aqueous solution and a hydrocarbon solution, wherein the aqueous solution contains nitrogen and heat-generating reactants and a pH buffer to delay the delivery of heat and nitrogen up to the chosen point in the conduit where the reaction is to begin, whereby paraffin is made to melt. The hydrocarbon solution comprises the necessary amount of a solvent selected for its ability to dissolve the particular paraffins of the deposit, as well as a modifier selected to produce a minimal pour point for the paraffins involved in the deposit. When the action of the emulsified aqueous solution is over, it is pumped off, while the paraffin deposit is withdrawn together with the aromatic solvent. U.S. Pat. No. 4,755,230 does not provide any field application for the dewaxing of pipes using the suggested process. Thus, there is no disclosure in such patent concerning means of previously determining the paraffin percentage of the partially plugged pipe, neither the amount of removal of the paraffin (performance of the process).

Thus, there is a continuous need for processes which could bring solution to the problems still associated to the dewaxing of conduits, that is, processes precisely disclosed as regards field experiments, wherein conduits actually plugged by paraffin deposits would have accurately established the paraffin content in their interior, the performance of the process being precisely determined, besides the guarantee of safe operation, especially in places of difficult reach.

Therefore, one objective of the present invention is a thermo-chemical process for the dewaxing of hydrocarbon transmission conduits whereby the percentage content of paraffin in the interior of the conduit is previously determined by assessing the effective internal volume using a contrasting fluid, further, the effective internal volume is again evaluated in order to assess the dewaxing operation performance.

Another objective is to provide an oil-in-water emulsin between aqueous base fluids which contain the chemicals and the oil base fluid which consists in aliphatic and/or aromatic hydrocarbons and their mixtures, the emulsion being stabilized by the addition of a suitable surface agent, which promotes within the proper period of time, the coalescence of the aqueous phases, whereby an exothermic chemical reaction is produced between the reactants, under simultaneous and controlled release of nitrogen and heat, which combined to the hydrocarbon mixture promote the fluidization and removal of the paraffin deposit.

Another objective is to provide a process for dewaxing conduits wherein the fluid composition, as a water-in-oil emulsion, is made up as a function of the kind and concentration of the chemical additives so as to produce a safe mechanism of coalescence and breaking of the emulsions, leading to an accurate as well as precise release of the heat and nitrogen potentials of the emulsions, according to the dimensions of the conduit under dewaxing treatment and the limitations of the circuit as a whole.

Still another objective is to provide a process for the dewaxing of conduits which is effected gradually and co-currently to the production flow, avoiding the building up of undesirable paraffinic plugs which impair the displacement of fluids in the interior of the conduit during the dewaxing process or thereafter in the flow of the produced oil.

SUMMARY OF THE INVENTION

The present invention relates to a process and composition for fluidizing and removing paraffin deposits from a hydrocarbon transmission conduit, by combining thermal, chemical and mechanical effects, which are simultaneously provided for by the dewaxing fluid, whereby the paraffin deposit is put in deep contact not only with the hydrocarbon solvent (the external phase of the emulsion) but also with the heat and nitrogen chemically generated by the nitrogen reactants which make up the internal phase of the emulsion.

The aqueous solutions which contain the selected nitrogen reactants are separately prepared in mixing tanks and thereafter added, still separately, to adequate volumes of an organic solvent suited for promoting the dissolution of the particular composition of paraffin deposit present in the interior of the conduit. In order to keep the aqueous phases duly emulsified, the process of the invention considers equally the addition of an emulsifier to the solutions at the moment they are prepared as well as during their injection into the conduit. For the chemical reaction to occur between the nitrogen reactants, a solution of a weak organic acid such as acetic acid is added to the emulsion which contains in the internal phase the nitrogen salt stable to slightly acid medium (pH between 3 and 6). Also, dispersing agents and/on pour point depressants can be advantageously added to the as-prepared emulsions.

According to previous calculations effected on the basis of figures of the internal effective volume or broadly on figures based on the whole circuit to be involved in the dewaxing treatment, suitable volume amounts of the two emulsions are prepared, the chemical composition of which serves the maximum requirements of fluidization ability as well as removal of the overall volume of the paraffin deposit. Such emulsions are then simultaneoulsy injected into the conduit, co-currently to the production flow throughout surface pumping systems, which provide a precise ratio between the emulsion flowrates, the emulsions being effectively mixed up since the converging point of the conduits which carry the emulsions up to the entrance of the conduit which is to be dewaxed.

The dewaxing operation of a conduit, for example, a subsea conduit placed in deepwaters—water depth higher than 526 feet (200 meters)—broadly comprises the following steps:

Adequately positioning and equipping the vessels which will be the injection terminals of the treating fluid (entrance) and recovering of the mixture spent fluid and fluidized paraffin (exit).

There are also operations which precede the dewaxing treatment itself of the conduit and which comprise the withdrawal the oil volume originally contained in the conduit immediately after production flow is stopped, the oil volume being displaced by seawater preferably countercurrently to the production flow, whereby the oil is returned to the production well in an environmentally friendly way and the conduit is ready for the next operation step. Then the conduit end which is to be the entrance of the injection loop is detached and lifted; eventually, sampling and evaluation of the deposit present at this end is effected; then, connections conduit combinations are fixed up to the pumping system in order to determine the initial effective internal volume which comprises assessing the volume of the paraffin deposit as well as the fluid injectivity of the conduit, by means of the injection of a contrasting fluid bed based on seawater, fluorescent organic dye (fluorescein) and a water soluble viscosifying agent (HEC), the displacement of the bed, under controlled flowrate, being effected by seawater pumping. Figures obtained at this step of the process, together with the characteristics of the freshly sampled paraffin, are the basis for calculation corrections to be brought to the operation, as regards volume and composition of fluids as well as operation conditions such as flowrate, pressure and rest time. The treating fluid is made up of two water-in-oil emulsions, which contain the nitrogen salts—ammonium chloride and sodium nitrite—these emulsions being prepared as described in Brazilian application PI 9004200 (now U.S. Pat. No. 5,183, 581), of the Applicant, the contents of which are fully incorporated herein as reference.

The adequacy of reactivity characteristics of the mixtures of freshly prepared emulsions to the operation conditions is monitored in a bench-scale laboratory belonging to the surface equipment used for preparing treating fluids.

The searched adequacy of reactivity characteristics as regards the treating fluid is obtained primarily through the addition of the adequate amount of catalyst, or secondarily through dilution of the thermal reserve by organic solvent make-up.

The two emulsions which constitute the treating fluid are pumped at the same and constant flowrate. The emulsions are sequentially displaced by means of a small volume bed made up of organic solvent and seawater, the volume of the bed being such as to place the treating bed in the second half of the conduit situated between the medium point of the length of the conduit and its outer end. The pumping system is then left still for a pre-set period of time in order to establish the best reaction conditions according to data obtained from the Numerical Simulation Process Software (NGS.TEC) which allows the best use of the treating fluid thermal and hydrodynamic potential. The first half of the conduit, that is, the portion situated between the injection point (entrance) and half the extension of the conduit is similary submitted to the action of the treating fluid for a pre-determined period of time as established in the previous step.

The software N.G.S. TECN, with the aid of a few input data such as: treating fluid volume and composition; fluid pumping pressure and flowrate, conduit extension, diameter, waxing degree and heat transfer coefficient and seabottom temperature, numerically simulates the conduit dewaxing process in that condition, by means of mass and energy balance during the generation of heat and nitrogen in the interior of the conduit. As output data, the NGS-TECN software provides, at every instant and every portion of the conduit extension, a temperature gradient together with particular pressure figures; the effective concentration of the reactants which make up the Nitrogen Generating System (nitrogen salts) as well as those of the fluid front, besides pointing out, at every processing instant, maximum values of temperature and pressure as well as the positions where these values occur in the conduit. Evaluation of data provided for by the N.G.S. TECN. Software makes up an overall view of the dewaxing process, which allows the ultimate adjustment of the best operating conditions.

The treatment performance monitoring is effected by assessing again the internal effective volume, by means of a contrasting fluid bed displaced by seawater; while once the effectiveness of the treatment is assessed through the absence of wax in the conduit, the conduit end which had been lifted is placed again underwater and linked to the production manifold of the field withdrawal system.

Nearly 5300 meters of conduits of 4 inches internal diameter which contained 16 $m^3$ of paraffin deposits, as measured by the effective internal volume, were treated by means of 35 $m^3$ of treating fluid injected into the conduit in two consecutive stages, the operation being supported by a subsea service ship and a boat for fluid preparation and pumping.

Figure 2:
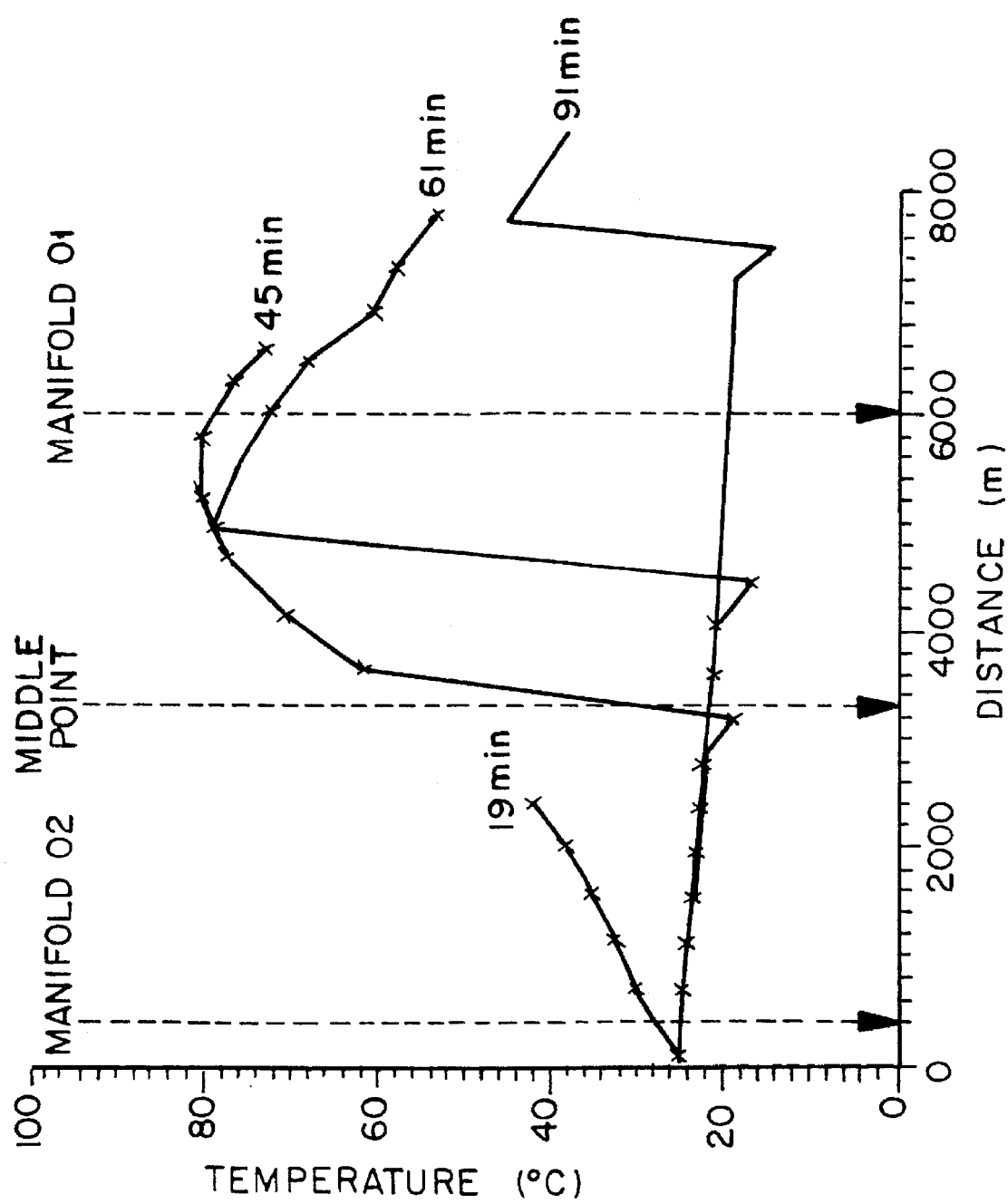

FIG. 2 shows the temperature profile curves of the treating fluid advancement front throughout the conduit extension as provided by a numerical simulation of the N.G.S. TECN Software. Temperature figures are indicated in the abscissa in degrees Centigrades 19, 45, 61 and 91 minutes after the beginning of the pumping of the first stage of treating fluid bed throughout the conduit.

Figure 3:
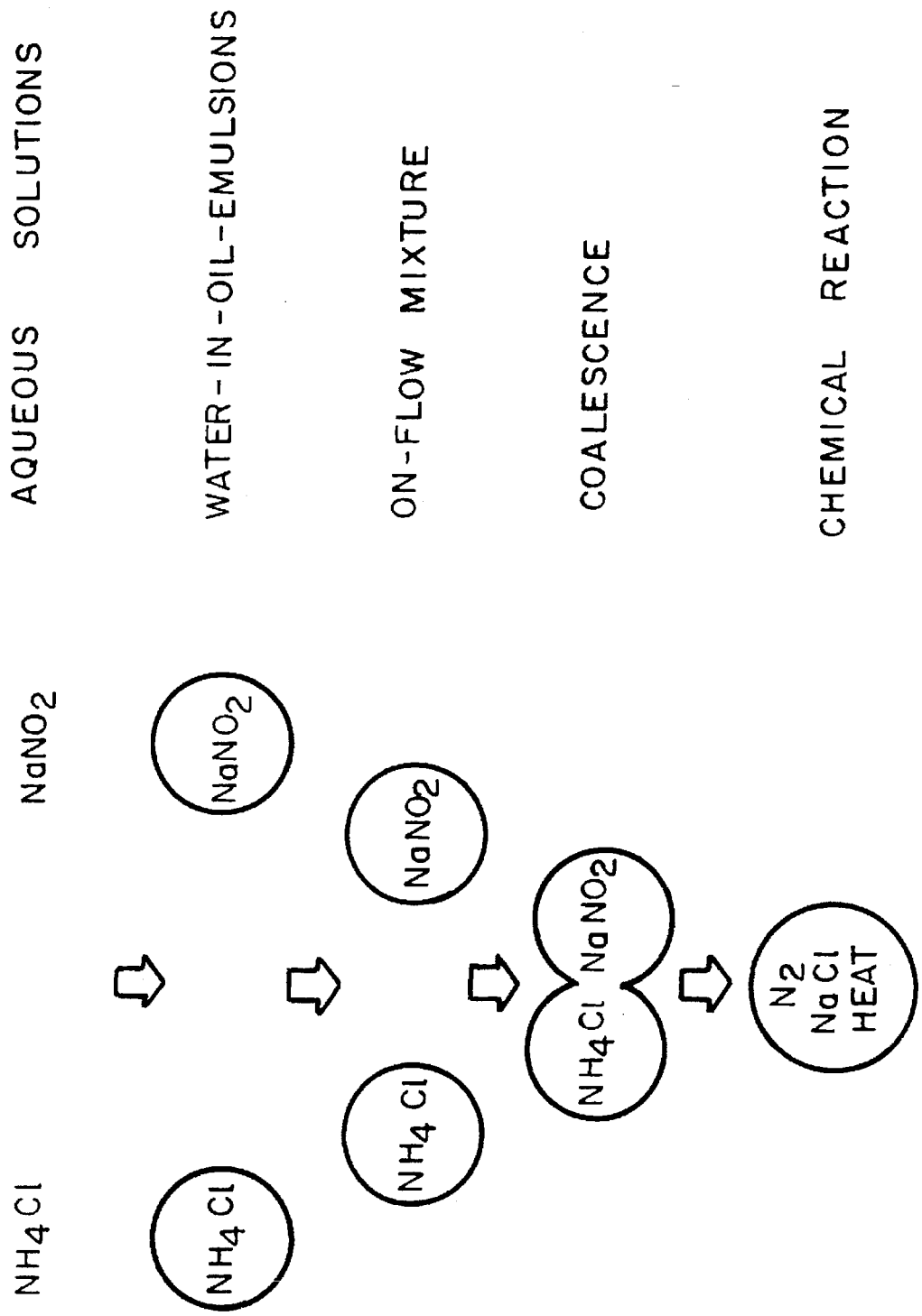

FIG. 3 illustrates the delaying mechanism of the beginning of the chemical reaction between the ammonium chloride and the sodium nitrite individually contained in the internal aqueous phases of emulsions C and N, respectively.

Figure 4:
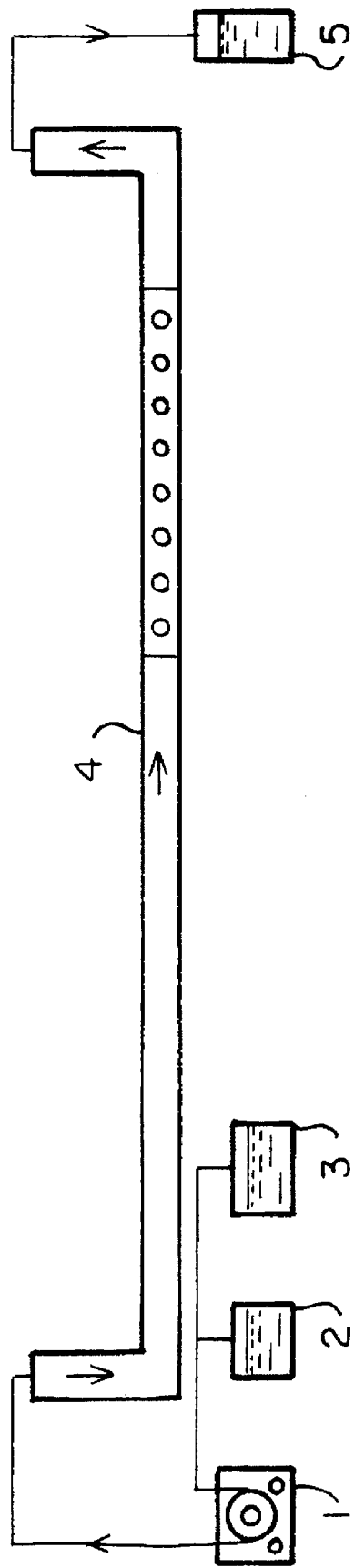

FIG. 4 illustrates a physical simulation of the process for measuring the effective internal volume, the simulation being carried out using a transparent plastic tube of 6.0 mm internal diameter and 12.50 meters length. At the end opposite to the pumping is installed a system for measuring volume and flowrate, the system being useful for the observation of the contrasting fluid position.

In FIG. 4, (1) is a pump, (2) is the contrasting fluid, (3) is the displacing fluid, (4) is a transparent tube and (5) is a measuring system.

FIG. 5 shows the change in behavior index and consistency index as a function of concentration of viscosifier (HEC).

PREFERRED MODE

EFFECTIVE INTERNAL VOLUME ASSESSMENT

The preferred manner to carry out the present invention involves necessarily on the one hand, a prior assessment of the waxing extent of the conduit and on the other hand, a final assessment of such extent, which should be either completely eliminated or at least thoroughly reduced.

In view of the extent waxing being of primary importance for the correct establishment of the overall operation designed to prepare the treating fluid, the Applicant has developed a contrasting fluid to be used in the assessment of the so-called "effective internal volume" of the conduit, whereby at first the oil originally present in the conduit is displaced counter currently to the production flow by means of seawater, followed by a contrasting fluid based on fluorescein (a dye) and hydroxyethylcellulose (viscosifying agent) and finally by seawater for displacement and effective internal volume assessment.

The contrasting fluid to be used in the hydrocarbon transmission conduits should be fairly stable as regards physical-chemical (chiefly regarding color stability) as well as theological properties (behavior and consistency indices) under the field conditions. It should be understood that, in order to introduce a contrasting property in a base fluid such as seawater, a viscosifying agent as guar gum or a dye or a suspended solid like bentonite is conventionally added.

In the evaluation of the effective internal volume of very long hydrocarbon transmission conduits, it is recommended to employ a small bed of contrasting fluid, while the remaining of the conduit volume is filled in by a displacing fluid such as seawater. Pumping flowrates adequate to the laminar flow are applied (of Reynalds index not greater than 1000), in order to preserve the advancement front of the contrasting fluid bed. The reliability of the effective internal volume evaluation lies on the precision of the observation of the reaching of the contrasting fluid at the end upwards the circuit as well as on the measurement of the integrated volume of pumped fluid (contrasting fluid+displacing fluid).

The present study has led the Applicant to the conclusion that creating the desired contrasting fluid by combining a viscosifying agent like hydroxyethylcellulose (HEC) and a dye like fluorescein is the best way to attend the requirements of rheological stability, absence of toxicity and biodegradability. Thus, the organic dye was synthesized from phthalic anhydride and resorcinol in the presence of zinc chloride at 200° C. After cooling, the reactants were treated with hydrochloric acid and water up to neutralization, dried and powdered.

The use of a contrasting fluid to establish the effective internal volume of conduits requires a base composition of adequate viscosity range as well as fluorescence to meet operation requirements such as conduit length, pumping limiting flowrate and fluid volume.

The laboratory-developed contrasting fluid should be submitted to tests for the evaluation of physical-chemical properties such as specific weight, optical properties such as absorbance and fluorescence as well as rheological properties such as behavior and consistency indices as a function of the concentration of dye (fluorescein) and viscosifying agent (HEC) as well as the pH and fluid temperature.

A physical simulation of the process of effective internal volume assessment is carried out by means of a transparent plastic tube of 6.0 mm internal diameter and 12.50 meters length. A system for measuring volume and flowrate is set at the end opposite to the pumping, which is also, according to FIG. 4, an observation post adequate for monitoring the position of contrasting fluid. The accuracy of the conduit effective internal volume in each measurement is provided for by the volume ratio.

$$ACCURACY = \frac{\text{Volume calculated}}{\text{Volume actual}}$$

A numerical simulation designed for the measurement of the effective internal volume leads, on the basis of physical simulation, to tables of the recommended values for viscosifying agent concentration and fluid volume per conduit length as a function of its inner diameter as well as of pumping flowrates adequate or the establishment of the best actual volumes to be employed in the assessment of the effective internal volume on a field basis.

SCHEME 1 below represents, on a field basis, the sequence of calculations used in the assessment of the effective internal volume.

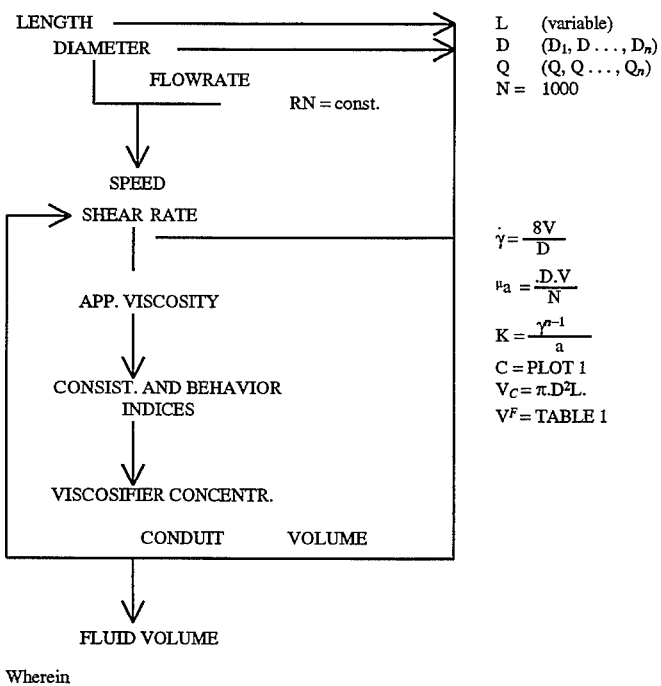

SCHEME 1

Wherein

RN = Reynolds Number
= density
n = behavior index
K = consistency index

For the sake of illustration, the preparation of the fluorescein dye is described below:

| Reactants | Amount (grams) |
|---|---|
| Phthalic Anhydride | 15.0 |
| Resorcinol | 22.0 |
| Zinc Chloride | 7.0 |

Under constant agitation, mix the ingredients at 180° C. and then at 210° C. for 130 minutes. To purify, mill in a mortar and wash with HCl 2% v/v then with hot water, filter and dry at 100° C., for a 21.7 g field, or 65% by weight. The as-synthesized fluorescein was analyzed as for physical-chemical properties.

The preferred dye concentration as a liquid product most adequate for field use is 5 grams/liter in a composition made up of 700 and acetone and 300 ml water.

On the other hand, a contrasting fluid composition can contain:

| Constituent | Role | Concentration |
|---|---|---|
| Seawater | Base fluid | 990 ml/l |
| HEC (QP-100 MH) | Viscosifying agent | 1 to 7.5 g/l |
| UPET PAN 207 | emulsion breaker | 1 to 2 ml/l |
| Fluorescein (Sol 5 g/l) | dye | 1 to 3 ml/l |
| NaoH 2% | pH modifier | 2 to 5 ml/l |

Color stability of the fluid was monitored for 48 hours, as well as its miscibility with Kerosene and petroleum, it being null in organic fluids; color diffusion is null, while an intense contrast appears between the fluorescent color (contrasting fluid) and petroleum, emulsion development by contact with organic fluids being very slight.

Physical simulation experiments using 5.0 ml/l fluorescein indicates a sharp, visible contrast.

TABLE 1 below illustrates figures obtained from a numerical simulation for flowrates of from 1 to 8 bpm (0.159 to 1.272 $m^3$ per minute) and conduits of several internal diameters, of from 2.5 to 10 in (6.35 to 25.4 cm).

TABLE 1

| FLOW-RATE | DIAMETER (in) | | | | |
|---|---|---|---|---|---|
| BPM | 2.5 | 4 | 6 | 8 | 10 |
| 1.0 | $\dot\gamma = 100$ | $\dot\gamma = 20$ | $\dot\gamma = 8$ | $\dot\gamma = 3$ | $\dot\gamma = 1$ |
|  | $\mu = 55$ | $\mu = 34$ | $\mu = 23$ | $\mu = 17$ | $\mu = 14$ |
|  | C = 3.8 | C = 2.0 | C = 0.1 | C = 0.1 | C < 0.1 |
|  | V = 0.2 | V = 0.1 | V = NR | V = NR | V = NR |
| 2.0 | $\dot\gamma = 210$ | $\dot\gamma = 52$ | $\dot\gamma = 15$ | $\dot\gamma = 6$ | $\dot\gamma = 3$ |
|  | $\mu = 110$ | $\mu = 69$ | $\mu = 46$ | $\mu = 34$ | $\mu = 27$ |
|  | C = 5.6 | C = 3.6 | C = 2.3 | C = 1.4 | C < 1.0 |
|  | V = 0.3 | V = 0.2 | V = 0.1 | V = 0.1 | V = NR |
| 3.0 | $\dot\gamma = 316$ | $\dot\gamma = 77$ | $\dot\gamma = 23$ | $\dot\gamma = 9$ | $\dot\gamma = 5$ |
|  | $\mu = 166$ | $\mu = 103$ | $\mu = 69$ | $\mu = 52$ | $\mu = 41$ |
|  | C = 7.1 | C = 4.5 | C < 3.0 | C < 2.1 | C < 1.5 |
|  | V = 0.4 | V = 0.3 | V = 0.2 | V = 0.2 | V = 0.1 |
| 4.0 | $\dot\gamma = 422$ | $\dot\gamma = 103$ | $\dot\gamma = 30$ | $\dot\gamma = 13$ | $\dot\gamma = 6$ |
|  | $\mu = 221$ | $\mu = 138$ | $\mu = 92$ | $\mu = 69$ | $\mu = 55$ |
|  | C > 8.0 | C = 5.3 | C = 3.6 | C = 2.6 | C = 2.0 |
|  | V = NR | V = 0.3 | V = 0.2 | V = 0.2 | V = 0.2 |
| 6.0 | $\dot\gamma = 633$ | $\dot\gamma = 154$ | $\dot\gamma = 46$ | $\dot\gamma = 19$ | $\dot\gamma = 10$ |

TABLE 1-continued

| FLOW-RATE | DIAMETER (in) | | | | |
|---|---|---|---|---|---|
| BPM | 2.5 | 4 | 6 | 8 | 10 |
| 8.0 | $\mu = 331$ | $\mu = 206$ | $\mu = 138$ | $\mu = 103$ | $\mu = 83$ |
|  | C > 8.0 | C = 6.8 | C = 4.5 | C = 3.5 | C = 2.7 |
|  | V = NR | V = NR | V = 0.3 | V = 0.3 | V = 0.2 |
|  | $\gamma = 844$ | $\gamma = 206$ | $\gamma = 61$ | $\gamma = 26$ | $\gamma = 13$ |
|  | $\mu = 442$ | $\mu = 275$ | $\mu = 184$ | $\mu = 138$ | $\mu = 110$ |
|  | C > 8.0 | C > 8.0 | C = 5.5 | C = 4.1 | C = 3.4 |
|  | V = NR | V = NR | V = 0.4 | V = 0.3 | V = 0.3 |

$\gamma = (1/\text{seg})$
$\mu$ (cP)
C = g/l
V = f. V conduit
NR = Not Recommended Another feature which is of paramount importance to the inventive process is the establishment of the laminar flow of the contrasting fluid by means of its viscosification as a function of its flowrate in the conduit. The integrity of the bed front of contrasting fluid is sought in order to secure its visibility at the observation post of the circuit during the effective internal volume assessment.

The best results obtained in effective internal volume assessment were those where the concentration of viscosifying agent was 5 g/l. The concentration of dye was 10 mg/l and the volume of contrasting fluid bed was 20% to 30% of the original conduit volume for shear rates higher than 180 seg$^{-1}$.

Broadly, it can be seen that for small diameter (2.5 to 4.0 inches) conduits high viscosity fluids (50 to 150 cP) at low flowrates (1.0 to 4.0 bpm) should be used. For high pumping flow rates (4.0 to 8.0 bpm), increasing bed volumes (30 to 40% of the conduit volume) should be employed.

As previously observed, N$_2$ generation is obtained by a method entirely described in Brazilian PI 9004200, of the Applicant, the contents of which are completely incorporated herein as reference.

Broadly considered, the process of conduit dewaxing of the present invention coprises the following steps:

a) adequately place ships at both ends of the line or conduit;

b) return the oil to the production well in order to withdraw it from the conduit in an environmentally friendly way, thereafter filling in the conduit with sea water;

c) disconnect the end upstream the conduit and bring it carefully to the surface in order to sample the paraffin deposit, assaying it as regards pouring behavior in the presence of solvents and increasing temperature;

d) sample the paraffin deposit while injection and monitoring lines are installed, as well as sampling valve;

e) assess the initial effective internal volume and injectivity: the presumed volume of organic deposit is inferred from the effective internal volume of the conduit by means of a bed of contrasting fluid (a fluorescein solution viscosified with HEC) displaced by means of seawater, simultaneously obtaining injectivity data for the conduit, these data being useful for designing the operation of preparing and pumping the nitrogen generating system:

f) based on data from c) and e), establish the definitive numerical simulation of the dewaxing treatment in order to define the amount of the fluids involved in the operation. This step is carried out using the computer software SGN-TECN-PER;

g) prepare treating fluid NGS/Emulsions, made up of two water-in-oil emulsions C and N—which contain as the internal phase the inorganic salts ammonium chloride and sodium nitrite. Both the aqueous salt solutions and their respective emulsions are prepared in a support ship;

h) evaluate process conditions by means of the freshly prepared emulsions. Activation of treating fluid with acetic acid is established as a function of pumping conditions established in f);

i) since the support ship placed upstream the process, pump the treating fluid prepared in step g) at the maximum possible pumping rate (for example 3 bpm). Emulsions are pumped at flowrates which are necessarily the same while being displaced by means of a small bed of kerosine and seawater so as to place the NGS at the second half of the conduit. The treating fluid is left still according to the period of time set according output data from the numerical simulation and the previous test on the freshly prepared emulsions;

j) after the period of rest, repeat the simultaneous pumping of emulsions C and N and their subsequent displacement with kerosene and seawater; repeat rest period for a pre-set period;

k) once the dewaxing treatment has reached the desired performance, effect the definitive NGS (2nd stage) displacement and assess the final effective internal volume by pumping a bed of contrasting fluid (fluorescein+HEC) displaced by seawater;

l) evaluate the treatment on the basis of results of effective internal volume assessments added to the preliminary analysis of the recovered fluids (spent NGS). The paraffin percentage removed by the NGS treatment can be calculated by the expression:

$$\% \text{ of paraffin removed} = \frac{V_2 - V_1}{V_0 - V_1} \times 100$$

where $V_0$=conduit original volue $V_1$=conduit volume as from initial internal effective volume assessment $V_2$=conduit volume as from final internal effective volume assessment In a typical situation, the treating fluid comprises the ammonium chloride solution (solution C), the sodium nitrite solution (solution N) as well as an organic solvent (kerosene) and a non ionic, lipophilic emulsifier, the mixture of solution C and solvent plus emulsifier and acetic acid giving rise to emulsion C, while the mixture of solution N and organic solvent plus emulsifier gives rise to emulsion N. Further, the mixture of emulsions C and N produces, exclusively on flow, the Nitrogen Generating System, emulsified NGS, as described and claimed in the Brazilian Application PI 9004200, herein fully incorporated as reference.

The present invention will be now illustrated by the following Example, which should not be construed as limiting the invention.

EXAMPLE

This Example illustrates the inventive dewaxing process as applied to subsea conduits placed in waters deeper than 520 feet (200 meters) at the Albacora Basin, Rio de Janeiro, Brazil.

The thermal, chemical and rheological characteristics of the oil extracted from the producing formation (Namorado Sandstone) lead to a strong tendency to precipitation of paraffinic portions whenever this oil is submitted to the thermal and hydrodynamical conditions present in the withdrawal of this field production. The dewaxing process of the invention was thus successfully applied in the Albacora field to a portion of a conduit of 4" internal diameter, the conduit linking two Production Subsea Manifolds (PSM) at a sea depth between 95 and 67 feet.

Figure 1:
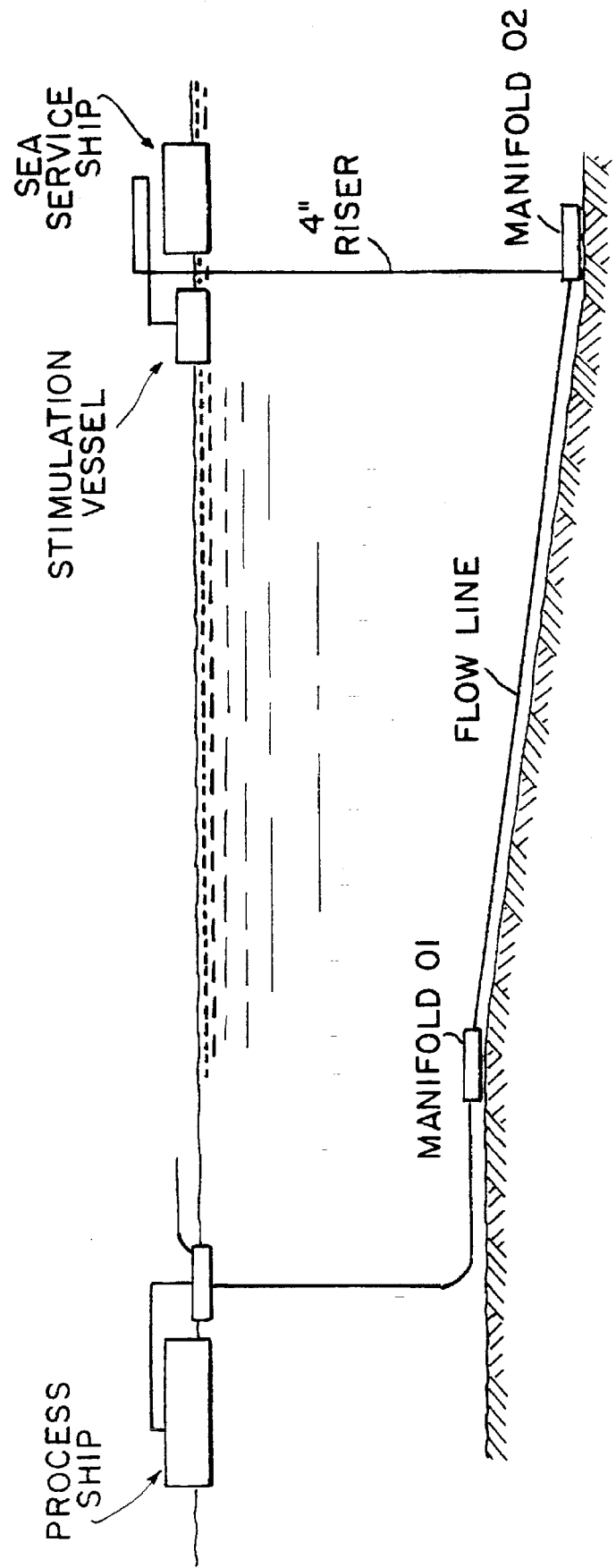
FIG. 1 shows a simplified flowsheet of conduit and lines circuit assembled in a system for oil production withdrawal at the Campos Basin, Rio de Janeiro, Brazil, in a deep water area (1004 feet or 316 meters depth), the circuit being designed for assessment of the effective internal volume and further treatment of the wax-containing portion by means of the Nitrogen Generating System/Emulsion.

TABLE 2 lists the overall data for this circuit, as well as for the effective internal volume assessment and the dewaxing. FIG. 1 illustrates the circuit.

TABLE 2

| CIRCUIT | |
|---|---|
| Overall extension | 9138 meters |
| treated extension | 5236 meters |
| internal diameter | 4 in (10.16 cm) |
| volume capacity | 8.1 liters/min |
| overall volume | 74.0 cubic meters |
| | 95 feet Manifold 01 |
| | 67 feet Manifold 02 |
| | 68.5 feet Process Ship |
| Average temperature | 8–12° C. |
| Average oil flowrate | 300 m³/day (from the production well 7-AB-09-RJS) |

EFFECTIVE INTERNAL VOLUME ASSESSMENT

| | |
|---|---|
| Contrasting fluid volume | 3.0 m³ |
| Dye | Fluorescein |
| Concentration | 5 mg/liter |
| Viscosifying agent | hydroxyethylcellulose |
| Concentration | 7.2 kg/m³ |
| base as pH modifier | to pH 8.0 |

FINAL EFFECTIVE INTERNAL VOLUME/ PERFORMANCE

After having treated 5,236 meters of conduit by means of NGS/EMULSION the final effective internal volume is measured the same way as used to evaluate the initial effective internal volume. The final effective internal volume has shown circuit free volume equal to 69.5 cubic meters, corresponding to a reduction in paraffin extent up to 9.7 volume % vs. 37.8 volume % paraffin initially present in the conduit.

PRODUCTION TEST

In order to evaluate the performance of the treatment, thereafter was effected a production test for the 7-AB-09-RJS well using the SGN/EMULSION freshly treated conduit. Results of production tests before and after the treatment were as follows:

| TEST | FLOWRATE | |
|---|---|---|
| | m³/h | m³/d |
| BEFORE NGS | 12.5 | 300 |
| AFTER NGS | 28.4 | 681 |

These figures are self-explanatory and demonstrate the excellence of the proposed treatment.

Also, the degree of accuracy of the effective internal volume assessment herein described and claimed, as demonstrated by repeated experiments, is excellent, that is, of the order of 0.3% of the volume of conduit or line being submitted to assessment of the free volume.

It should be understood that, in spite of the fact that the present process has been described and claimed in relation to subsea conduits, same process can, without any substantial modification, be used in the dewaxing of underground and/or surface conduits, where similar paraffin deposits usually occur.

We claim:

1. A process for the thermo-chemical dewaxing of a hydrocarbon transmission conduit by means of a nitrogen generating system (NGS) emulsion injected co-currently to hydrocarbon flow comprising the steps of:

a) placing support ships over the conduit to be dewaxed, displacing oil remaining in the conduit countercurrently to the production flow, lifting an end of the conduit up to one of the support ships and sampling a wax deposit from the conduit, filling said conduit with sea water and connecting injection lines provided with controls to said conduit;

b) assessing the percentage content of wax in the conduit by assessment of an initial effective internal volume by means of a contrasting fluid bed which is displaced by sea water;

c) devising a numerical simulation for the treating fluid injection process based on data obtained in step b);

d) calculating the necessary volume of treating fluids based on numerical simulation data from step c);

e) preparing a NGS emulsion of adequate concentration and volume based on data from steps c) and d), the NGS emulsion comprising a flow mixture of two distinct water-in-oil emulsions each having an internal phase containing ammonium chloride and sodium nitrite, respectively, said emulsions being prepared in mixing tanks in one of said support ships;

f) choosing an adequate amount of acetic acid activating agent for a pilot test using freshly prepared emulsions based on pumping conditions established in step d);

g) pumping the NGS emulsion prepared in step e) at a maximum allowed flow rate, flow rates of both emulsions being necessarily the same, displacing said emulsions upon completion of said pumping by means of an organic solvent and sea water until the NGS emulsion is located in a desired position along the length of the conduit and leaving the NGS emulsion at rest to allow the NGS emulsion to effect dissolution and emulsification of the wax deposit and subsequent withdrawal of the emulsified wax deposit;

h) assessing performance of the dewaxing process by effecting final displacement of the NGS emulsion and assessing the final effective internal volume by pumping a contrasting fluid bed made up of fluorescein, hydroxyethylcellulose (HEC) and sea water;

i) evaluating the dewaxing based on data obtained from the effective internal volume assessment as well as from preliminary analysis of spent NGS emulsion; and j) calculating the percentage of wax removed by the dewaxing process using the NGS emulsion by means of the expression $$\% = \frac{V_2 - V_1}{V_0 - V_1} \times 100$$

$V_0$=effective volume of the conduit $V_1$=conduit volume according to initial effective internal volume assessment $V_2$=conduit volume according to final effective internal volume assessment.

2. A process for the thermo-chemical dewaxing according to claim 1, wherein the contrasting fluid used in the assessment of the effective internal volume of step b) comprises sea water in a concentration of 990 ml/liter, a viscosifying agent comprised of HEC in a concentration of from 1 to 7.5 g/l, a water soluble, nonionic demulsifier in a concentration of from 1-2 ml/liter, a dye comprised of fluorescein in a concentration of from 5 to 15 mg/l, and a pH modifier comprised of NaOH 2 wt % of which 2 to 5 ml/l are used.

3. A process for thermo-chemical dewaxing according to claim 1, wherein the NGS emulsion is prepared in concentrations of from 3.0 to 6.0 molar for ammonium chloride, and of from 3.0 to 9.0 molar sodium nitrite emulsified in an organic solvent.

4. A process for the thermo-chemical dewaxing according to claim 1, wherein step e) includes adding a catalyst for the chemical reaction leading to the generation of $N_2$ which occurs between sodium nitrite and ammonium chloride, said catalyst being acetic acid in a concentration of from 0.1 to 5.0 volume %.

5. A process for the thermo-chemical dewaxing according to claim 1, wherein as a consequence of the nitrogen gas generated by the breaking of the water-in-oil emulsion, the withdrawal of the emulsified wax deposit is self-driven.

6. A process for the thermo-chemical dewaxing according to claim 5, wherein in the conduit, pumping of the NGS emulsion is from upstream to downstream while the withdrawal of the emulsified wax deposit is from downstream to upstream.

* * * * *